July 4, 1950          H. W. BAEHR          2,513,706

CORNER GUARD FOR BARN CLEANERS

Filed June 6, 1947          2 Sheets-Sheet 1

INVENTOR.
Herman W. Baehr,
BY
Morsell & Morsell
ATTORNEYS

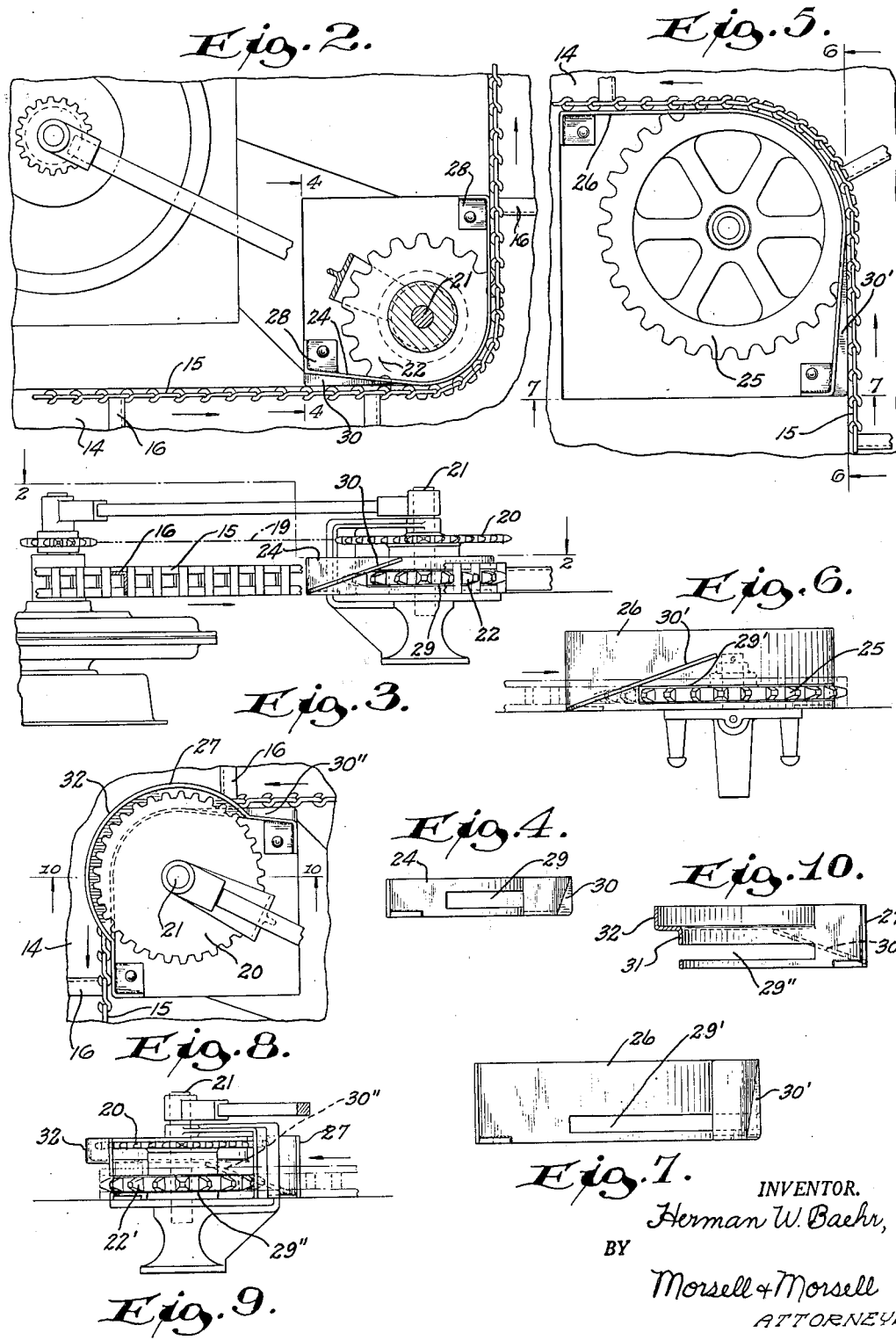

Patented July 4, 1950

2,513,706

UNITED STATES PATENT OFFICE 2,513,706

CORNER GUARD FOR BARN CLEANERS

Herman W. Baehr, Waupaca, Wis., assignor to Eagle Manufacturing Company, Appleton, Wis., a corporation of Wisconsin Application June 6, 1947, Serial No. 752,960

8 Claims. (Cl. 198—229)

This invention relates to improvements in corner guards for barn cleaners, and more particularly to guards for the sprockets about which a barn cleaner conveyor chain operating in a rectangular gutter, is trained.

There are available for animal barns automatic cleaners in the form of flight equipped endless conveyors movably mounted in continuous rectangular gutters or troughs formed in the barn floors adjacent the rear of the stalls. In a barn floor gutter of the type mentioned a conveyor is adapted to operate therein for the purpose of conveying the litter from the livestock stalls to a conveniently arranged outgoing conveyor or elevator, and the latter transports the litter exteriorly of the barn for deposit into a vehicle or in a pile. Adjacent each corner of the rectangular gutter the conveyor chain is trained about a sprocket, and a general purpose of the present invention is to provide instrumentalities adjacent said sprockets which will scrape and remove litter from the conveyor chain to prevent the litter from getting onto and clogging the sprocket and adjacent mechanisms.

In an installation of the type under consideration, different problems are involved at different corners of the rectangular gutter due to the fact that at one or more of the corners there may be positive drive mechanisms extending to the sprocket or sprockets for propelling the conveyor chain, and at other corners the sprockets engaged by the conveyor chain may simply be idlers, and another factor to be taken into consideration is that the sprocket immediately beyond the outgoing or discharge conveyor or elevator does not need the degree of protection afforded the sprockets at other corners because the conveyor chain at the mentioned location is relatively free of accumulated litter. With the foregoing factors in mind, it is a more specific object of the invention to provide corner guards for barn cleaner chains which, while generally similar, have specific differences to suit the special requirements for the particular sprockets with which they are associated.

A further object of the invention is to provide corner guards for a barn cleaner conveyor chain which not only function to remove litter from the conveyor chain, but also guide the chain in its travel relative to the engaged sprockets and prevent a tendency on the part of the chain to follow a sprocket beyond the desired point of engagement and being strained or damaged thereby.

A further object of the invention is to provide corner guards for barn cleaner conveyor chains which are easily applied in an installation and which function automatically during the travel of the conveyor.

A further object of the invention is to provide corner guards for barn cleaner conveyor chains which do not interfere with the gutter in which the conveyor operates and which permit free functioning and travel of the conveyor.

A further object of the invention is to provide corner guards for barn cleaner conveyor chains which are of simple construction, which are efficient in operation, and which are well adapted for the purposes described.

With the above and other objects in view, the invention consists of the improved corner guards for barn cleaner conveyor chains, and their parts and combinations as set forth in the claims, and all equivalents thereof.

In the accompanying drawings in which the same reference characters indicate the same parts in all of the views:

Fig. 2 is an enlarged fragmentary plan view, with parts in section, of the corner guard for a drive sprocket immediately beyond the discharge point of the barn cleaner conveyor, said view being taken on line 2—2 of Fig. 3;

Fig. 3 is a front view of the showing in Fig. 2.

Fig. 4 is a detail view of the corner guard shown in Fig. 2, said view being taken on line 4—4 of Fig. 2;

Fig. 5 is an enlarged fragmentary plan view of an idler sprocket corner of the assemblage showing the corner guard applied thereto;

Fig. 6 is a view taken on line 6—6 of Fig. 5;

Fig. 7 is a detail view of the corner guard for an idler sprocket taken on line 7—7 of Fig. 5;

Fig. 8 is an enlarged fragmentary plan view of a drive sprocket and corner guard assemblage engaging a portion of the conveyor remote from the discharge;

Fig. 9 is a side view of the showing in Fig. 8; and

Fig. 10 is a detail sectional view of the form of corner guard utilized with the drive sprocket of Figs. 8 and 9, said view being taken on line 10—10 of Fig. 8.

Figure 1:
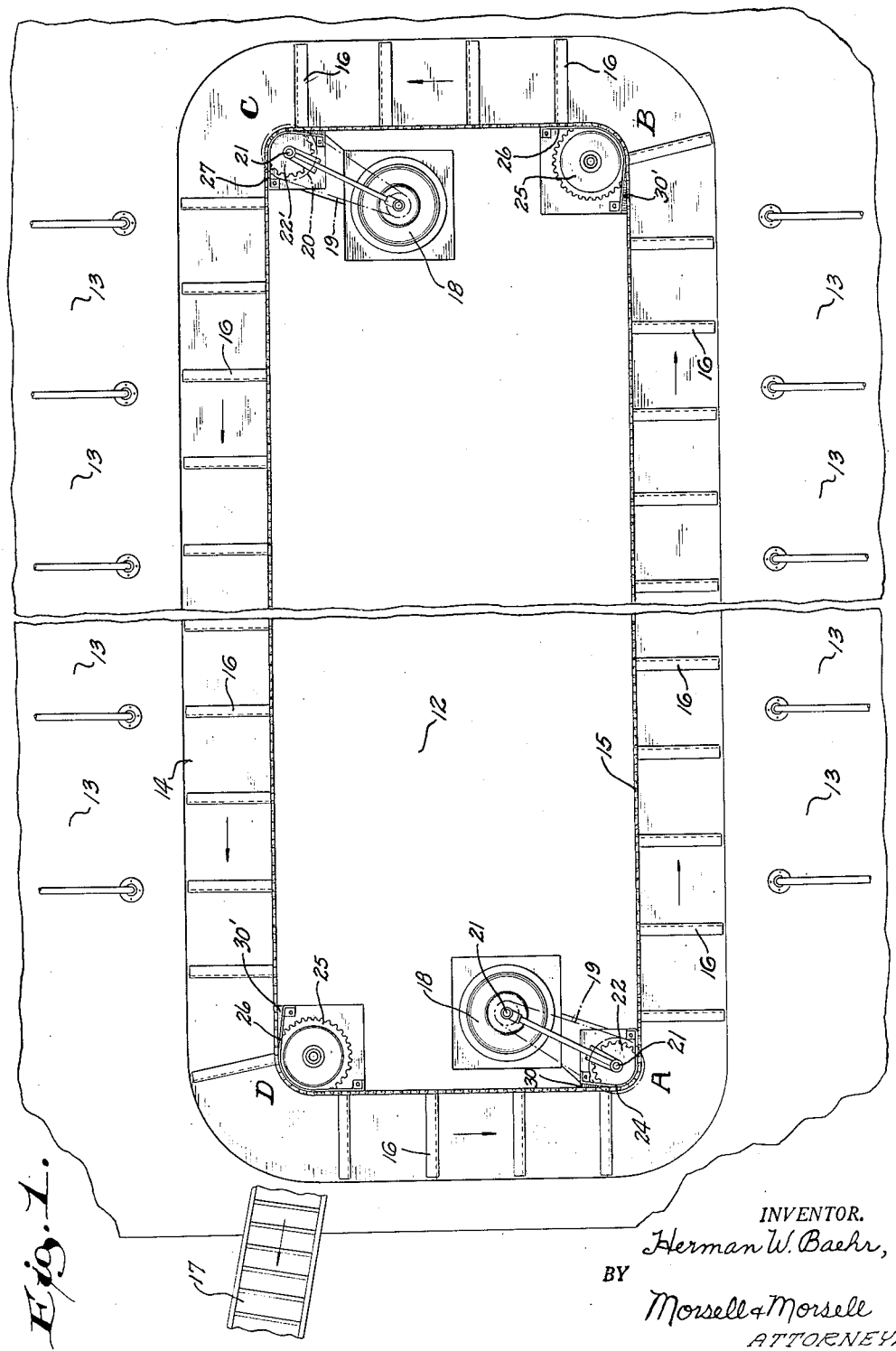
Fig. 1 is a plan view of a rectangular gutter or trough in a barn floor adjacent the rear of animal stalls disposed thereabout, showing the automatic barn cleaner conveyor operating in the gutter, a pair of drives therefor, the sprockets about which the conveyor chain is trained, and guards for the sprockets at the various corners.

The utility of the various forms of corner guards in relation to the sprockets in a typical barn cleaner installation can best be observed from Fig. 1 wherein the stalls in a cattle barn, arranged on opposite sides of a longitudinal aisle 12 are indicated by the numerals 13. Formed in the concrete floor in said aisle is a rectangular gutter or trough 14 with longitudinal extents thereof being adjacent the rear ends of the stalls 13. The rectangular gutter 14 has disposed therein an automatic barn cleaner or litter conveyor in the form of an endless chain 15 which traverses inner side wall portions of the gutter 14 and has attached thereto inner end portions of spaced apart conveyor flights 16.

Adjacent the corner portions of the gutter 14 there are recesses for the mounting of sprockets about which the conveyor chain 15 is trained. In the installation illustrated, the conveyor is adapted to move in a counterclockwise direction in the gutter 14 and adjacent the corner designated D in Fig. 1 there is a pit to receive the litter carried by the endless conveyor and the lower end of an outgoing conveyor or elevator 17 extends into said pit to remove the litter to a point exteriorly of the barn. The corner designated A in Fig. 1, immediately beyond the discharge point of the conveyor, is a drive corner and an electric motor 18, through a chain or other driving medium 19 drives a pinion 20 fast on a vertical sprocket shaft 21 which shaft also has fast thereon, spacedly below the pinion 20, a sprocket 22 which drivingly engages the conveyor chain 15. This "near corner" driving sprocket 22 is not subjected to accumulated litter because the conveyor has discharged its load at the pit in corner D immediately thereadjacent. Therefore, a relatively low corner guard 24 for the near corner drive sprocket 22 is utilized.

Referring again to Fig. 1 at the corner of the gutter 14 designated B, the conveyor chain 15 engages an idler sprocket 25 and a similar idler sprocket 25 is utilized adjacent the discharge corner D. At both of the corners B and D for the idler sprockets 25 a corner guard 26 is utilized which, because of the fact that considerable litter is being transported by the conveyor at these points, is somewhat higher than the guard at corner A.

Where the installation is relatively large and the barn cleaner is apt to have a heavy load imposed thereon, it may be desirable to have more than one drive, and in the installation illustrated in Fig. 1, in addition to the drive at corner A, the diagonally opposed corner designated C may also be used for a drive. The arrangement at corner C will in this event include another electric motor 18 which, through a chain 19, drives a pinion 20 fast on the upper end of a vertical sprocket shaft 21. Fast on the sprocket shaft 21 below the pinion 20 is a sprocket 22'. At the corner C, due to the superimposed relation of the sprocket 22' and pinion 20 and the fact that at this point in the travel of the conveyor considerable litter is being moved, it is necessary to have a modified type of corner guard 27 which will extend up and protect both the sprocket 22' and the pinion 20 from litter which might be clinging to the chain 15.

The specific construction of the various forms of corner guards utilized at the various corners of the gutter will be described more fully hereinafter, but it may be stated that the corner guard and assemblage at corner A is shown in Figs. 2, 3 and 4. The corner guard and assemblage utilized for the idler sprockets at corners B and D is shown in detail in Figs. 5, 6 and 7, and the corner guard for the additional drive at corner C, and the assemblage is shown in Figs. 8, 9 and 10.

As is conventional, litter from the various stalls 13 is deposited into the gutter 14, and when it is desired to clean the barn, the electric motors 18 are set into operation. Through the driving connections the sprockets 22 and 22' on the driven shafts 21 turn to propel the endless chain 15 in the direction indicated by the arrows in the drawings. The movement of the conveyor chain will cause the angled flights 16 to push the refuse in the gutter toward the discharge corner D.

As will be clear from what has been said heretofore, the present improvements reside particularly in the construction and association of the various corner guards 24, 26 and 27. These corner guards are for the specific purpose of engaging the inner surface of the conveyor chain 15 during its travel and scraping litter or refuse therefrom and carrying such scraped refuse over the chain and sprockets to cause the refuse to fall free of the moving parts and into the gutter 14 to be carried along by the conveyor flights. It might additionally be observed that the teeth on the various sprockets are relatively square and the tendency is for the conveyor chain to cling to the sprockets and to follow the same beyond the desired points of engagement. This tendency, if not counteracted, will strain the conveyor chain. However, the various guards 24, 26 and 27, besides functioning to remove litter from the chain to prevent the litter from being deposited onto and gumming the sprockets and moving parts, function to direct the conveyor chain in a rectilineal path at the points where the chain should properly disengage the sprockets.

Referring now specifically to the guard 24 for the "near corner" drive, it will be seen from Figs. 2, 3 and 4 that said guard is in the form of a metal band bent so as to have an arcuate intermediate portion described substantially on the radius of the drive sprocket 22 with oppositely directed end portions which are angularly separated from one another by slightly less than 180°. The opposite extremities of the member 24 are formed with flat base portions 28 to permit the guard 24 to be bolted or otherwise secured to a plate or floor portion of the pit in which the sprocket 22 is mounted. The guard 24 as thus rigidly mounted projects upwardly so as to partially encircle an outer peripheral portion of the sprocket 22. The intermediate curved portion of the guard 24 is formed with an elongated slot 29 through which the teeth of the sprocket 22 project to engage the conveyor chain 15. The guard 24 is relatively low, as will be observed from Figs. 3 and 4, and extends only a short distance above the sprocket 22 and chain 15. Secured to the outer face of the inner end of the member 24 is a forwardly upwardly inclined scraper 30 which is also upwardly outwardly reduced in width. This scraper, as will be seen from Fig. 3, extends above the rearward end of the slot 29. During movement of the conveyor chain 15 in the direction indicated the inner surface of the chain will ride along the outer edge of the scraper 30 of the guard 24. This scraper will function to remove accumulated litter from the chain and because of the forward movement of the chain, said removed litter will be pushed forwardly upwardly along the top face of the scraper 30 and will ultimately fall into the gutter 14 adjacent the corner A. The corner guard 24, by virtue of the upwardly inclined scraper 30, causes a relatively clean extent of conveyor chain 15 to be presented to the teeth of the sprocket 22 which project through the guard slot 29 and the undesirable accumulation of litter or foreign matter on the sprocket is thereby prevented. The guard 24 at the "near corner" drive is relatively low because the conveyor has deposited its load into the removal pit at corner D and should be relatively free of litter by the time it advances to corner A.

A corner guard 26, such as is used at corners B and D (Fig. 1), is shown in detail in relation to its idler sprocket 25 in Figs. 5, 6 and 7. This guard 26 is constructed similarly to the guard 24, previously described, and it is similarly associated with its sprocket. The main difference is that the curved metal band constituting the guard 26 is of substantially greater height than the guard 24. This is for the reason that at the corners of the installation where the idler sprockets 25 are utilized, the conveyor will have carried thereadjacent a large load of litter and the high guard at these points provides greater protection for the sprockets and shafts. Associated with the guard 26 and an integral part thereof is an upwardly forwardly inclined scraper 30' which functions similarly to the scraper 30 on the guard 24, except that it is longer and extends to a greater elevation. The guards 26 are also formed intermediate their ends with slots 29' through which the teeth of the idler sprockets 25 project for engagement with the conveyor chain 15.

A modified arrangement is required for the conveyor corner wherein the sprocket 22' is positively driven. The corner requiring this modified type of guard corresponds to the corner C in Fig. 1, and the problems are presented by virtue of the fact that the gear 20 which receives its power from the motor 18, is superimposed on the shaft 21 relative to the driven sprocket 22' and is of greater diameter than the sprocket 22'. Therefore, the guard 27 (see Figs. 8, 9 and 10) takes the form of a lower curved metallic band portion 31 with an upward extension 32 outwardly offset relative to the lower portion 31. The lower portion 31 of the guard therefore partially encircles an outer peripheral portion of the sprocket 22' and is formed with a slot 29'' through which some of the teeth on the sprocket 22' may project to engage the conveyor chain 15. The outwardly offset upper portion 32 of the guard 27 forms a fence around outer peripheral portions of the driven gear 20. The lower portion 31 of the guard 27 carries on its outer surface an upwardly forwardly projecting scraper 30'' which functions relative to accumulations of foreign matter on the chain 15 in a manner similar to the scrapers on the other guards described.

From the foregoing description it will be evident that the automatic barn cleaner functions in its usual manner, but that adjacent peripheral portions of all of the sprockets which are engaged by the conveyor chain are enclosed by upstanding metallic guards in the form of collars. These guards carry inclined tapered scrapers which function, during movement of the conveyor chain to scrape material therefrom and to carry it forwardly away from the chain and to cause said material to be pushed off of the scrapers into the gutter 14. Due to the problems involved at different corners of an installation, the guards at the various corners may be somewhat modified over one another but in general they all involve the same principle of enclosing peripheral portions of the sprockets with wall portions of the guards being slotted to permit projection therethrough of the sprocket teeth for engagement with the conveyor chain, together with upwardly forwardly directed fixed scrapers to carry material clinging to the chain upwardly for deposit into the gutter, and free of the chain.

The improved corner guards for barn cleaners are easily mounted, do not interfere with the operation of the barn cleaner and function automatically during movement of the conveyor chain. The corner guards are of simple and inexpensive construction and are well adapted for the purposes described.

What is claimed as the invention is:

1. In combination, a conveyor chain having one extent thereof at an angle to an adjacent extent, a horizontally disposed sprocket engaging the conveyor chain at the junction of said angularly related extents, a curved, upright guard plate mounted to fence off a peripheral portion of the sprocket and being interposed between the chain and the sprocket, and a scraper on an outer surface of the guard plate between the latter and an inner side of the chain, said guard plate having a slot therein through which teeth of the sprocket which engage the chain project.

2. In combination, a driven conveyor chain having one extent thereof at an angle to an adjacent extent, a sprocket engaging the conveyor chain at the junction of said angularly related extents, a curved guard plate mounted to fence off a peripheral portion of the sprocket and being interposed between the chain and the sprocket, and an upwardly, forwardly inclined scraper on an outer surface of the guard plate engaging only the sprocket side of the conveyor chain, said guard plate having a slot therein through which teeth of the sprocket which engage the chain project.

3. In combination, a driven conveyor chain having one extent thereof at an angle to an adjacent extent, a sprocket engaging the conveyor chain at the junction of said angularly related extents, a curved guard plate mounted to fence off a peripheral portion of the sprocket and being interposed between the chain and the sprocket, said guard plate having a slot in an intermediate portion through which teeth of the sprocket which engage the chain project, and an upwardly, forwardly inclined scraper on an outer surface of the guard plate engaging the sprocket side of the conveyor chain, the rear end of the scraper being rearwardly of said slot and the scraper extending above the slot and the sprocket portion projecting therethrough.

4. The combination with a driven conveyor chain having one extent thereof at an angle to an adjacent extent, and a horizontally disposed sprocket engaging the conveyor chain at the junction of said angularly related extents, of a curved upright guard plate interposed between the chain and the sprocket and formed with a slot through which teeth of the sprocket which engage the chain project, the rear end portion of said plate carrying a litter scraper and elevator which is inclined upwardly in the direction of travel of the chain to a position above the slot and sprocket teeth to cause litter scraped from the chain to be carried over and free of the sprocket during advance movement of the chain.

5. The combination with a driven conveyor chain having one extent thereof at an angle to an adjacent extent, and a sprocket engaging the conveyor chain at the junction of said angularly related extents, of an angularly shaped guard plate having an intermediate portion curved substantially on the radius of said sprocket, said plate having an elongated slot therein through which teeth of the sprocket which engage the chain project, and a scraper rigidly carried by the outer face of the guard plate engaging the sprocket side of the conveyor chain and extending upwardly in the direction of travel of the chain to a position above the slot.

6. In combination, a driven endless conveyor chain having one extent thereof at an angle to an adjacent extent, a horizontally disposed sprocket engaging the conveyor chain at the junction of said angularly related extents, a generally angularly shaped, upright guard plate mounted to fence off a peripheral portion of the sprocket and being interposed between the chain and the sprocket, said guard plate having a slot therein through which teeth of the sprocket which engage the chain project, and an upwardly, forwardly inclined scraper fast on an outer surface of the guard plate engaging the sprocket side of the conveyor chain, and projecting laterally therefrom, the rear end of the scraper being rearwardly of said slot and the scraper extending above the slot and the sprocket portion projecting therethrough.

7. The combination with a driven conveyor chain operating in a refuse collection gutter and having one extent thereof at an angle to an adjacent extent, and a sprocket engaging the conveyor chain at the junction of said angularly related extents, of a generally angularly shaped guard plate interposed between the chain and the sprocket with its plane at right angles to the plane of the sprocket and formed with a slot through which teeth of the sprocket which engage the chain project, the rear end portion of said plate carrying on its outer surface a litter scraper and elevator interposed between the guard plate and the inner side of the chain, said scraper and elevator being inclined upwardly and reduced in width in the direction of travel of the chain to a position above the slot and sprocket teeth to cause litter scraped from the chain to be carried over and free of the sprocket during advance movement of the chain and to fall into the gutter.

8. In combination, a driven conveyor chain having one extent thereof at an angle to an adjacent extent, a horizontally disposed sprocket engaging the conveyor chain at the junction of said angularly related extents, a vertical shaft on which said sprocket is mounted fast, a driven disc fast on said shaft above the sprocket, the disc being of greater diameter than the sprocket, a curved guard plate interposed between the chain and the superimposed sprocket and disc to protect peripheral portions of the sprocket and disc, the upper portion of said plate adjacent the disc being outwardly off-set relative to the lower portion of the plate, said guard plate having a slot in its lower portion through which teeth of the sprocket which engage the chain project, and an upwardly, forwardly inclined scraper on an outer surface of the guard plate.

HERMAN W. BAEHR.

REFERENCES CITED

The following references are of record in the file of this patent:

UNITED STATES PATENTS

| Number | Name | Date |
|---|---|---|
| 952,520 | Hamachek | Mar. 22, 1910 |
| 1,429,991 | Wilkes et al. | Sept. 26, 1922 |
| 1,800,814 | Boldt | Apr. 14, 1931 |